May 22, 1956 H. W. DONOVAN 2,746,314
ADJUSTABLE STROKE ACTUATOR
Filed Sept. 3, 1953
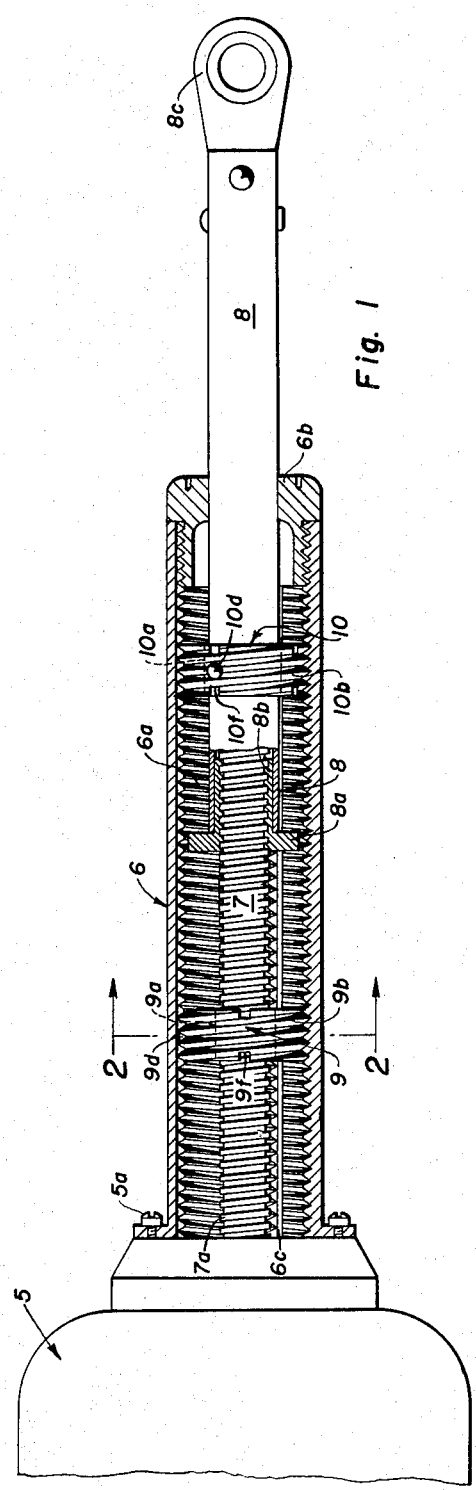
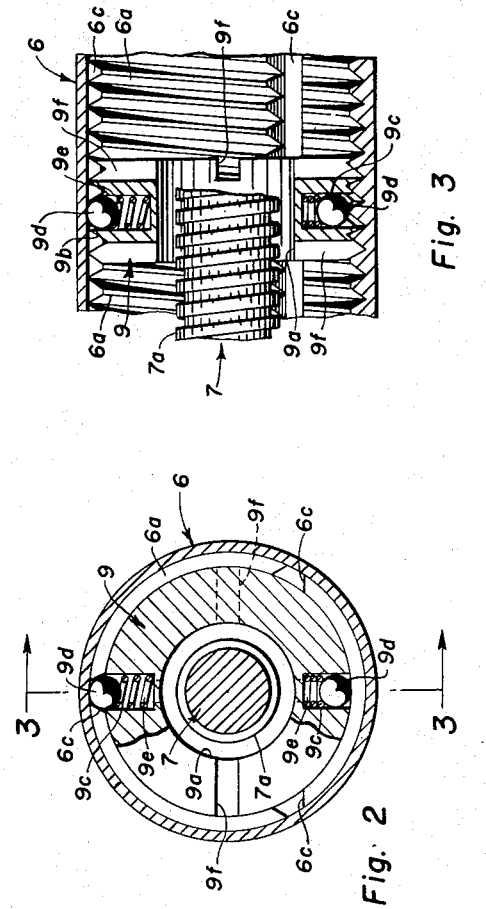
Howard W. Donovan
INVENTOR.
BY *James M. Clark*
ATTORNEY

United States Patent Office 2,746,314
Patented May 22, 1956

2,746,314

ADJUSTABLE STROKE ACTUATOR

Howard W. Donovan, Fort Worth, Tex., assignor, by mesne assignments, to General Dynamics Corporation, a corporation of Delaware Application September 3, 1953, Serial No. 378,301

8 Claims. (Cl. 74—424.8)

The present invention relates generally to linear actuators and lead screw actuating mechanisms, and more particularly to improved arrangements for limiting and regulating the strokes of reciprocable actuator elements.

While the present invention has general applicability to linear actuators of all types, it is particularly adapted to the screw type actuators commonly used with such aircraft components as tabs, flaps, landing gears, closures and the like. It is relatively important in many of these and other applications that the actuated member be positioned and stopped with considerable accuracy in each of the positions to which it may be moved, and it is also frequently very desirable that these limiting movements of the actuating mechanism be conveniently adjustable and without too great difficulty.

It is, accordingly, a major object of the present invention to provide an improved linear actuator having means for quickly and accurately adjusting the length of the stroke of the actuator components. It is a further object to provide such an actuator and adjusting mechanism which is relatively light in weight, compact, positive-acting and foolproof in its operation. It is a still further object to provide relatively simple adjusting elements having spring-pressed ball detents or the like which are readily moved into adjusted positions with simple and available tools. Other objects and advantages of the present invention reside in the novel arrangement and details of the actuator components and their manner of cooperation to provide an improved unitary actuating device.

These and other objects and advantages of the present invention are pointed out in the following description in terms of the embodiment thereof which has been illustrated in the accompanying drawings forming a part hereof. It is understood, however, that these drawings are for purposes of illustration only and are not intended as defining the limits of this invention, for which reference should be had to the appended claims.

In the accompanying drawings:

Fig. 1 is an assembly view partly in cross-section of a linear actuator embodying the present improvements;

Fig. 2 is an enlarged cross-sectional view of one of the adjustable stop units as taken along the lines 2—2 of Fig. 1; and Fig. 3 is an enlarged cross-sectional view of the same as taken along the lines 3—3 of Fig. 2.

Referring now to Fig. 1, the numeral 5 represents the body of the electric or fluid motor or other source of rotary power by means of which the linear actuator is driven. A cylindrical guard or cover 6 is provided with a flanged end by means of which it is secured to the end of the motor body 5 as by the screws 5a. The interior of the barrel guard or cover 6 is provided with a continuous internal running thread 6a extending from one end of the cover to the other. The opposite end of the cover 6 is provided with an externally threaded end bearing plug 6b the threads of which engage the internal threads 6a of the cover 6 for which the member 6b provides both the end closure for the threaded portions and a guide for the rod 8, suitable holes being provided in the end of member 6b for engagement by a wrench for assemblying and removing this end fitting.

A lead screw element 7 is coaxially disposed within the internally threaded cover 6 and is provided with a continuous running thread 7a throughout its length. The element 7 is secured to and driven by the motor or power source within the body 5 with suitable controls for starting, reversing and arresting its rotation. An actuator rod or tube 8 is slidably disposed within the end guide portion 6b of the actuator cover and is provided at its inner end with an internally threaded and flanged terminal fitting 8a which is fixedly secured to the internal bore of the rod 8. The flanged terminal fitting 8a is provided with internal threads 8b which are engaged by the male threads 7a of the lead screw 7 whereby rotative movement of lead screw 7 effects linear movement of rod 8. The opposite or outer terminal of the rod 8 is provided with a terminal fitting 8c which is adapted to be pivotally connected to the component which is to be moved by the actuator device. It will, accordingly, be obvious that dependent upon the direction of rotation of the lead screw the rod or push-pull tube 8 will be withdrawn into the housing cover 6 or extended therefrom for transmission of this linear movement to the component to be moved. The latter is usually mounted in such manner that it prevents rotation of the rod 8.

My improved means for adjustably limiting the stroke of the actuator rod 8 is represented by the stop fittings 9 and 10, which may be substantially identical. It is, accordingly, considered that the detailed description of the inner stop fitting 9 as shown in the assembly in Fig. 1 and in detail in Figs. 2 and 3 will suffice for the other fitting 10. The internal threads 6a of the cover 6 are interrupted by a plurality of longitudinally extending grooves or slots 6c. These grooves are preferably disposed equidistantly about the axis of the actuator screw 7, those in the embodiment illustrated being 120° apart. The sides of the grooves, as defined by the end spaces of the individual threads 6a, are convergent with the circumferential dimension of the grooves at the crests of the individual threads 6a being appreciably greater than the corresponding circumferential dimension as measured at the root thereof.

The adjustable stop member 9 comprises essentially an annular body having a central bore 9a of a diameter somewhat greater than the outside diameter of the threads 7a on the jack screw 7 such that a clearance space is provided therebetween. The adjustable stop 9 is externally threaded at 9b to engage the internal thread 6a of the cover tube 6. The member 9 is also provided with radially extending bores or blind openings forming the detent recesses 9c within which are disposed the detent balls 9d and which are urged outwardly by the compression spring 9e interposed between the ball and bottom of each recess 9c. Both end faces of the stop members 9 are provided with radially extending slots or grooves 9f for engagement by a spanner wrench or other tools for rotating the stop 9 to advance the same longitudinally along the axis of the jack screw to the desired limit position.

As shown in Fig. 2, the ball 9d at the top of the assembly is urged upwardly by the compression spring 9e into the longitudinal slot 6c cut through the threads 6a of the cover tube 6. The ball 9d at the lower side of the fitting 9 bears against the flattened tops of one or more of the threads 6a. As the adjustable stop member 9 is rotated by a suitable tool inserted in the slot 9f either of the detent balls 9d are caused to snap into, or be forced into, one of the slots 6c in which it is retained despite severe vibration to which the lead screw assembly may be subjected in service. When it is desired, however, to advance the adjustable stop member 9, this can be readily done by the application of torque to the grooves or slots 9f of the stop member which causes the ball 9d to ride up or to be cammed by the sloping end faces of the screw threads 6a, forming the tapering sides of the slots 6c.

In Fig. 2, there has been shown for illustrative purposes three longitudinal slots 6c and a pair of oppositely disposed detent balls 9d. Accordingly, with the slots spaced 120° apart rotationally about the axis of the actuator screw 7, and with oppositely spaced detents, it is possible to set or latch the stop member 9 in a series of adjusted positions which are spaced apart half of this angular distance, or 60° apart, with a corresponding advantage along the axis of the lead screw device depending upon the pitch of the threads 6a—9b. Obviously where finer adjustments are required, it is possible to provide a greater number of longitudinal slots or a correspondingly greater number of detents. It is understood that the present invention is not limited to any specific combination of balls and retaining slots. The actuator may, for example, assume a form wherein a single groove is provided in the threads 6a and three ball detents are provided in the stop member 9 spaced 120° apart, thereby providing rotational adjustment every 120°. The same degree of adjustment could obviously be obtained by providing three longitudinal grooves spaced 120° apart rotationally and providing a single ball detent in the stop member 9.

The opposite stop member 10 may also be identical with the number 9 which has just been described. For purposes of illustrating the invention, the stop member 9 has been shown in Fig. 1 as having its ball detent 9d engaging the slot at the top of the figure while the stop member 10 to the right of the flanged portion 8a of the reciprocating rod 8 is disposed with one of its ball detents 10d engaging the slot at the lower far side of the cover 6 (not shown), but with the opposite detent 10d exposed and illustrated at the top near side of the stop member 10. The detent ball 10d which appears in Fig. 1 on the upper near side of the stop member 10 is accordingly the ball which is not engaged in one of the longitudinal slots 6c and which bears against the tops or inner edges of the threads 6a, which have been removed in this figure to show the external threads 10b of the stop member 10. The latter member 10 is also provided with an internal bore 10a which clears the outside diameter of the actuator rod 8. It is noted that bore 9a of stop member 9 and bore 10a of stop member 10 are each of sufficient diameter as to afford ready clearance for screw member 7 and actuator rod 8 accommodated, respectively, therewithin. In order to adjust the position of the stop member 9, access to the interior of the cover tube 6 may be gained by removal of the screws 5a and separation of the tube 6 from the motor body 5. The opposite stop member 10 may be adjusted by removal of the end bearing or guide fitting 6b which exposes the outer face and the radial slots 10f of the latter stop member. The inwardly directed stroke of the actuator assembly is limited by the flanged fitting 8a of the non-rotatable actuator rod 8 bearing against the outer face of the stop member 9. Similarly, the outward stroke of the actuator tube 8 is limited by the opposite face of the flanged fitting 8a meeting the inner face of the outer stop member 10.

With linear actuators provided with the improved adjustable stops disclosed it is possible to keep fewer sizes in stock and to permit a single design to be used for numerous applications. It is also possible to keep the screw actuator within the power requirements of the installation as well as to limit the power to which the device will be subjected.

Other forms and modifications of the present invention, both with respect to its general arrangement and the details of its respective parts, which become obvious to the reader skilled in the art are intended to come within the scope and spirit of the present invention, as more particularly defined in the appended claims.

I claim:

1. In a screw type linear actuator including a rotatable lead screw element, a non-rotatable actuator element engaged by said lead screw element for relative axial movement with respect thereto, the improvement comprising an external cover element provided with an internally threaded portion, an abutment portion carried by said lead screw element, and an adjustable stop element provided with external threads for engagement with the internal thread of said cover element arranged to be rotated into a predetermined position axially thereof to limit the linear movement of said actuator element by engagement of said abutment portion with said stop element.

2. In an actuating mechanism, a rotatable screw element, a non-rotatable element having a threaded portion engaged by said rotatable screw element arranged for linear movements with respect thereto, an internally threaded tubular element coaxially disposed about said rotatable and non-rotatable elements, an abutment portion carried by said lead screw element, and a stop element having external threads engaging the threads of said internally threaded element arranged for adjusted positioning therealong to limit the linear movement of said non-rotatable element by engagement of said abutment portion with said stop element.

3. In a lead screw actuating mechanism, a rotatable screw element, a non-rotatable internally threaded element threadedly engaged with said rotatable screw element arranged for linear movements with respect thereto, an internally threaded tubular cover element coaxially disposed about said rotatable and non-rotatable elements, an abutment portion carried by said lead screw element, and an externally threaded stop element threadedly engaging the threads of said internally threaded element arranged for adjusted rotation for positioning therealong to limit the linear movement of said non-rotatable reciprocating element by engagement of said stop element with said abutment portion.

4. In a linear lead screw actuating device, a rotatable screw element, a non-rotatable element having a threaded portion engaged by said rotatable screw element arranged for linear movements with respect thereto, an internally threaded cover element coaxially disposed about said rotatable and non-rotatable elements, the improved means for limiting the linear movement of said non-rotatable reciprocating element with respect to said screw element comprising an abutment portion carried by said non-rotatable element and a stop element having external threads engaging the threads of said internally threaded cover element engaged for adjusted positioning in the axial direction therealong for engagement by said abutment portion to limit the linear movement of said non-rotatable reciprocating element.

5. In a screw type linear actuator including a rotatable lead screw element and a non-rotatable actuator element engaged by said lead screw element for relative axial movement with respect thereto, the improvement comprising an external cover element provided with an internally threaded portion, an abutment portion carried by said lead screw element, an adjustable stop element provided with external threads in engagement with the internal threads of said cover element, and slot means formed in said stop element adapted for engagement by a spanner type tool for rotating said adjustable stop element while threadedly engaged with the internally threaded portion of said cover element for axial movement into an adjusted position with respect to said screw element in which it provides a limit stop for said non-rotatable actuator element by engagement with the abutment portion thereof.

6. A screw type linear actuator comprising a rotatable lead screw element, a non-rotatable actuator element engaged by said lead screw element for reciprocating movement with respect thereto, an external cover element provided with an internally threaded portion, an abutment portion formed on said actuator element, an annular stop element provided with external threads for engagement with the internal threads of said cover element, power means for rotating said lead screw element and slot means formed in said stop element adapted for engagement by a spanner type tool for rotating said adjustable stop element while threadedly engaged with the internally threaded portion of said cover element for axial movement into an adjusted position with respect to said cover element in which it provides a limit stop for the reciprocating movement of said non-rotatable actuator element by engagement of said abutment portion thereof with said adjustable stop elements.

7. In a screw type linear actuator including a rotatable lead screw element, a non-rotatable actuator element engaged by said lead screw element, the improvement comprising an external cover element provided with an internally threaded portion, an abutment portion formed on said actuator element, an adjustable stop element provided with external threads in engagement with the internal threads of said cover element, and slot means formed in said stop element adapted for engagement by a spanner type tool for rotating said adjustable stop element while threadedly engaged with the internally threaded portion of said cover element for axial movement into an adjusted position with respect to said cover element, and detent means carried by said stop element in engagement with the internally threaded portion of said cover element for releasably retaining said stop element with respect to said cover element in which said stop element provides a limit stop for said nonrotatable actuator element by engagement of the abutment portion thereof with said stop element.

8. A screw type linear actuator comprising a rotatable lead screw element, a non-rotatable actuator element engaged by said lead screw element for reciprocating movements with respect thereto, an external cover element provided with an internally threaded portion, an abutment portion formed on said actuator element, an annular adjustable stop element provided with external threads for engagement with the internal threads of said cover element, power means for rotating said lead screw element, said adjustable stop element arranged for rotation while threadedly engaged with said cover element for axial movement into an adjusted position, and spring-pressed detent means cooperatively carried by said stop element and said cover element for releasably retaining said stop element with respect to said cover element in which it provides a limit stop for the reciprocating movement of said non-rotatable actuator element.

References Cited in the file of this patent
UNITED STATES PATENTS

| | | |
|---|---|---|
| 1,903,053 | Kuba | Mar. 28, 1933 |
| 2,398,841 | Morris | Apr. 23, 1946 |